Figure 1:
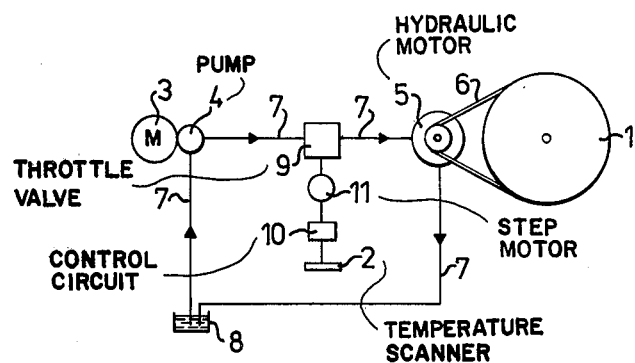

United States Patent [19]

Bergkvist

[11] 4,274,474
[45] Jun. 23, 1981

[54] HYDRAULIC CONTROL AND DRIVE DEVICE FOR ROTARY HEAT EXCHANGER

[76] Inventor: Lars A. Bergkvist, Gottne, 890 42, Mellansel, Sweden

[21] Appl. No.: 5,725

[22] Filed: Jan. 23, 1979

[30] Foreign Application Priority Data

Jan. 30, 1978 [SE] Sweden ............................ 7801121

[51] Int. Cl.³ ............................................ F28D 19/00
[52] U.S. Cl. ......................................... 165/7; 60/463; 60/484; 91/37
[58] Field of Search ............... 165/8, 7, DIG. 12; 91/36, 37, 35; 60/463, 484

[56] References Cited

U.S. PATENT DOCUMENTS

| | | | |
|---|---|---|---|
| 3,687,192 | 8/1972 | Pettersson | 165/8 |
| 4,066,047 | 1/1978 | Vadakovic et al. | 123/41.12 |
| 4,089,088 | 5/1978 | Vionczalski | 165/7 X |

FOREIGN PATENT DOCUMENTS 1451237  1/1969  Fed. Rep. of Germany ............ 165/8

Primary Examiner—Albert W. Davis
Attorney, Agent, or Firm—LeBlanc, Nolan, Shur & Nies

[57] ABSTRACT

A rotary regenerator is provided with a hydraulic drive system to vary the rotational speed in relation to the temperature scanned. The hydraulic control system provides accurate operation at low rotational speeds.

3 Claims, 5 Drawing Figures

HYDRAULIC CONTROL AND DRIVE DEVICE FOR ROTARY HEAT EXCHANGER

This invention relates to a hydraulic control and drive device for a rotary heat exchanger.

Systems with rotary heat exchangers are used for the ventilation of large rooms, for example industrial premises, hospitals, official buildings etc., according to the principle, that indoor air when being blown out passes through a rotary heat exchanger in parallel with the axis of rotation of the heat exchanger, and outdoor air at its injection into the building passes through the heat exchanger in a corresponding way. The two respective air streams pass through the heat exchanger in a respective angle sector of about 150°-180°. Owing to the rotation of the heat exchanger, the heat exchanger portion heated by one air stream will heat the other air stream. However, the rotary speed of such a heat exchanger is an important variable, both in order to obtain a high efficiency degree of the heat exchanger and for controlling the temperature of the indoor air. Depending on the outdoor temperature, normally the number of revolutions of the heat exchanger should be variable between 0.5 to 10 revolutions per minute (rpm) in order to obtain a desired indoor temperature.

Known systems for controlling the rotary speed of the heat exchanger comprise an expensive and complicated control circuit, which controls an asychronous motor, which drives the heat exchanger. A temperature scanning member delivers an input signal to the control circuits.

The number of revolutions of the asynchronous motors generally is controlled by cutting at every half cycle the supplied alternating voltage at a certain phase angle.

In order to be able to adjust the motor speed for example from 0.5 to 10 rpm, the alternating voltage must be cut before the maximum voltage has been obtained. This implies that at control in the lowest portion of the interval faults in the motor operation arise, primarily because the motor moment is low. It happens, for example, often that the motors come to a standstill when a low speed is desired.

Known systems are still more complicated when several heat exchangers are used in parallel. One problem in this connection is to bring about a fully synchronous drive of all heat exchangers. In order to obtain a satisfactory effect, it may be necessary in certain cases to make an adjustment of about one twenty-fifth of revolution per minute.

The present invention provides a very simple device for controlling and driving rotary heat exchangers.

The invention, thus, relates to a hydraulic control and drive system for rotary heat exchangers including a temperature scanning means and a heat exchanger drive means which includes a hydraulic motor, and a second motor coupled mechanically to a hydraulic pump for supplying the hydraulic motor with pressure medium of sufficient pressure and rate, the control including a valve between the pump and the hydraulic motor, the valve having an adjustment range from a low or stopped flow to full flow, and the temperature scanning member variably controls the valve via a throttle member so that the rate and pressure of pressure medium to the hydraulic motor, and thus its rotary speed, are determined by the setting of the valve responsive to a function predetermined in relation to the scanned temperature.

Figures 2, 3:
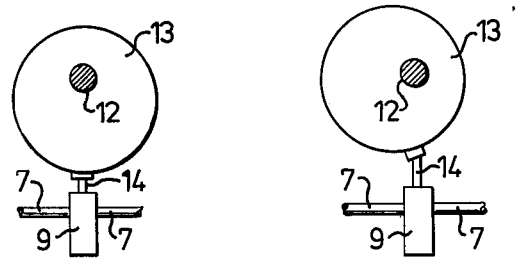
Figures 4, 5:
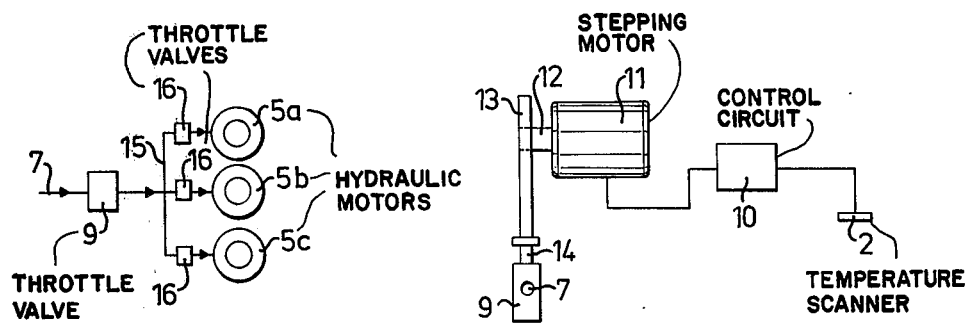

The invention is described in greater detail in the following with reference to the accompanying drawing, in which FIG. 1 is a schematic block diagram for a device according to the invention, FIGS. 2 and 3 show an eccentrically supported disc and a valve associated with the control device, FIG. 4 shows a detail in the block diagram for a device comprising three heat exchangers, FIG. 5 is a lateral view of a portion of the control device.

In FIG. 1 a schematic block diagram for a device according to the invention is shown, which comprises a rotary heat exchanger 1 of a suitable type and temperature scanning means 2. The drive device for the heat exchanger comprises an electric motor 3, which is connected mechanically to a pump 4, and a hydraulic motor 5 of known type. The pump 4 supplies the hydraulic motor with pressure medium of sufficient pressure and rate. The hydraulic motor 5 preferably drives the heat exchanger 1 by means of a belt 6. A piping system 7 for the pressure medium extends from the pump 4 to the hydraulic motor 5 and back to the pump 4 via a trough 8. The flow direction of the pressure medium is indicated by arrows on the piping system 7 in FIG. 1.

A valve 9 is located between the pump 4 and the hydraulic motor 5. The valve preferably has a setting range from a low or completely stopped flow to a fully open one. By means of the valve 9, thus, the flow and the pressure of the pressure medium from the pump 4 to the hydraulic motor 5 can be varied.

The valve 9 is controlled by a control device comprising mechanic and/or electric means, by which the flow and the pressure of the pressure medium to the hydraulic motor, and thereby the rotary speed thereof, are determined by the setting of the valve according to a function, which is predetermined in relation to the scanned temperature.

The control device 10,11 comprises a stepping motor 11 or a corresponding one, on the shaft 12 of which a cam disc is fastened, or alternatively a circular disc 13 is fastened eccentrically, and a control circuit 10. The disc 13 abuts an adjusting means 14 of said valve 9.

The temperature scanning device 2 is of a suitable known type and preferably capable to emit an electric signal according to a predetermined function in relation to the scanned temperature. Said signal is emitted to the control circuit 10. The control circuit 10 is of a suitable known type and capable to control the stepping motor 11, which is capable via the control circuit 10 to assume a definite angular position according to a function predetermined in relation to the scanned temperature.

This implies that the disc 13 will set the valve 9 via the adjusting means thereof with respect to pressure and rate of the pressure medium, whereby the rotary speed of the hydraulic motor is determined by the setting of the valve according to a function predetermined in relation to the scanned temperature.

The temperature scanning device 2 preferably scans the temperature of the indoor air, whereby as described above the rotary speed of the heat exchanger is set in view of the indoor air temperature. The said predetermined functions are adjusted in each individual case in view of the size of the room, the desired ventilation, etc.

In FIG. 5 a portion of the control device is shown seen from the side. In FIGS. 2,3 and 5 the disc by way of example is shown as an eccentrically attached circular disc, but a cam disc may be used instead thereof. Also modifications with respect to the control device can be imagined within the scope of the invention. The control device, for example, may consist of a magnet-hydraulic valve actuated directly by the control circuit 10 instead of as indicated of the valve 9, stepping motor 11 and disc 13. At a further embodiment the temperature scanning device is a bimetal member, wax member or some other temperature scanning member, which electrically or mechanically actuates a valve between the pump 4 and the hydraulic motor 5.

According to the invention, a very high precision of the rotation speed of the hydraulic motor, and therewith of the heat exchanger is obtained, because the hydraulic motor can be adjusted to rotate very slowly with a high torque at the same time as it can be adjusted to relatively high numbers of revolution.

The stepping motor can be designed to assume a great number of different angular positions for a certain temperature interval.

The simple structure of the control and drive device, besides, implies the possibility of manufacturing inexpensive installations with high operation reliability.

The present invention is particularly advantageous over the known art when several rotary heat exchangers for the exchange of air to a room or building are installed. In such a case the device is designed so as to have several hydraulic motors 5a,5b,5c, preferably one for every heat exchanger. A manifold 15 possibly with throttle valves 16 then is mounted after the valve 9, seen from the pump 4, as shown in FIG. 4. The manifold 15 distributes pressure medium of equal pressure and rate to all hydraulic motors, so that all hydraulic motors and there with the heat exchangers are operated entirely synchronously.

The present invention is not to be regarded restricted to the embodiments described above, but can be varied within the scope of the attached claims.

I claim:

1. A control and drive device for rotary heat exchangers, comprising: a temperature scanning means; drive means for connection to rotary heat exchangers: said drive means comprising a hydraulic pump, a hydraulic motor, a second motor drive coupled mechanically to said pump, and means providing fluid communication between said pump and said hydraulic motor supplying a fluid pressure medium at sufficient pressure and rate; a valve provided in the fluid communication means between said pump and said hydraulic motor said valve preferably having an adjustment range substantially from a closed to fully open; a throttle means connected between said temperature scanning means and said valve to control the valve position whereby the rate and pressure of said pressure medium from the pump to the hydraulic motor, and therewith the rotary speed of the hydraulic motor, are determined according to a function predetermined in relation to the scanned temperature, said throttle means comprising a control circuit and a stepping motor including a rotary shaft carried camming device; said valve having an adjustment member connected to be positioned by said camming device; said stepping motor being controlled to assume a predetermined angular position responsive to a signal condition from said temperature scanner predetermined in relation to the scanned temperature.

2. A device according to claim 1, for controlling a plurality of rotary heat exchangers wherein for each heat exchanger, a hydraulic motor is provided and adapted to be drive connected to its associated heat exchanger and said fluid communication means includes a manifold means between said valve and in parallel fluid communication to all of said hydraulic motors for providing pressure medium for driving all of the heat exchangers at the same speed.

3. A device according to claim 2, wherein individual control means, each including a throttle valve, are provided in individual fluid communication paths from said manifold means to associated ones of said hydraulic motors.

* * * * *